Patented Mar. 3, 1936

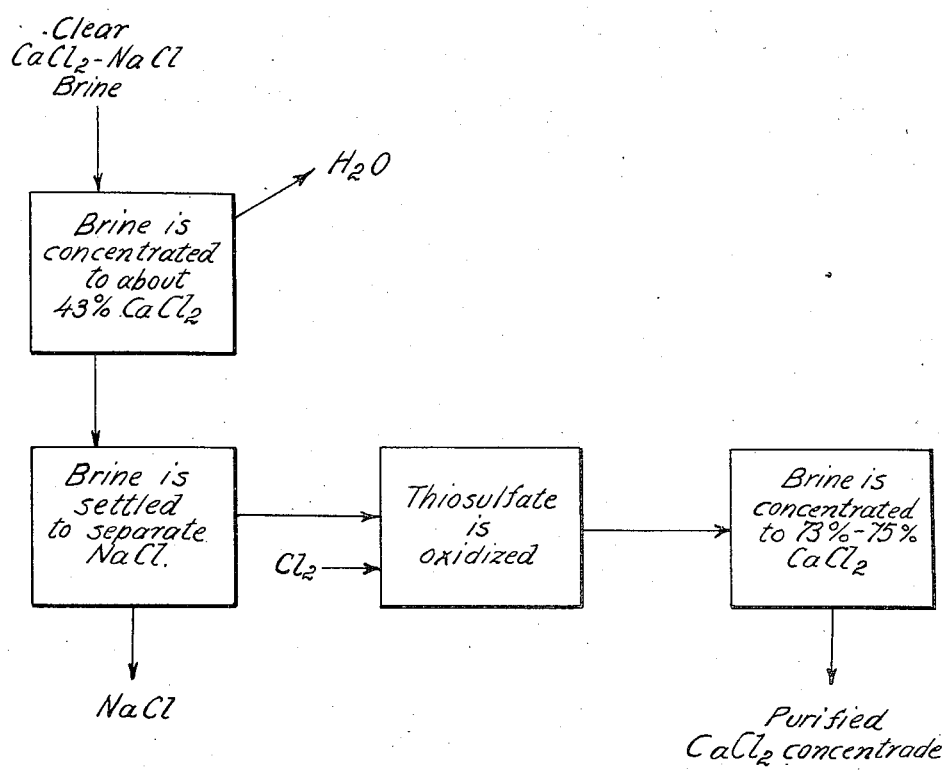

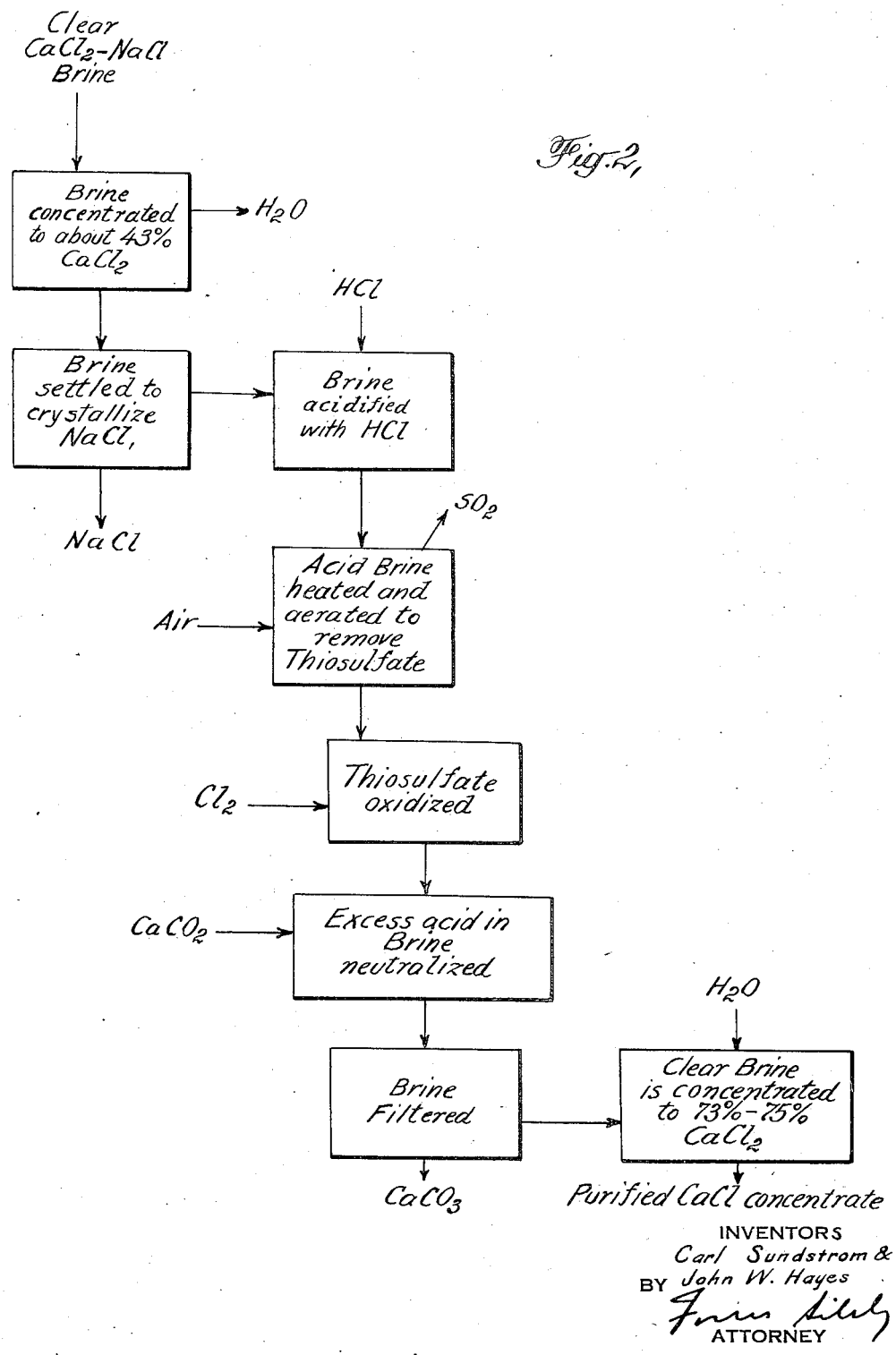

2,032,727

UNITED STATES PATENT OFFICE 2,032,727

PURIFICATION OF CALCIUM CHLORIDE BRINES

Carl Sundstrom and John W. Hayes, Syracuse, N. Y., assignors to The Solvay Process Company, New York, N. Y., a corporation of New York Application May 31, 1934, Serial No. 728,386

14 Claims. (Cl. 23—90)

This invention relates to the preparation of calcium chloride and is particularly directed to the production of a calcium chloride of unusually good color from the calcium chloride liquor obtained in the ammonia-soda process.

In the ammonia-soda process sodium bicarbonate is prepared by treating an aqueous sodium chloride solution with ammonia and carbon dioxide. An ammonium chloride liquor is produced as a by-product. In order to regenerate ammonia from this ammonium chloride liquor, it is treated with lime, thus forming calcium chloride and ammonia. The ammonia is again used in the process. The calcium chloride solution that is formed generally contains a rather large proportion of sodium chloride and also impurities.

The raw materials in the preparation of the sodium bicarbonate thus include ammonia, carbon dioxide, and sodium chloride, in addition to lime, which is used for the regeneration of the ammonia. The ammonia is generally obtained as ammonia liquor produced as a by-product from the manufacture of coke. The carbon dioxide and lime are obtained by "burning" limestone with coke in lime-kilns. The limestone usually contains some calcium sulphate, which is more or less reduced in the burning process and which, together with the sulphur usually contained in the coke, accounts for oxidizable sulphur compounds, such as thiosulphates and sulphides, contained in the lime and gas from the lime-kilns. The sodium chloride used also contains impurities. From these various sources considerable amounts of impurities are introduced into the system with the result that, prior to the present invention the solid calcium chloride obtained by evaporation of the above-mentioned calcium chloride solution usually has been of a grayish color and the solutions obtained by dissolving it in water are usually dark in color and have a turbidity often exceeding 400 parts per million of suspended solids.

It has now been discovered that this grayish color of the solid salt and the turbidity of solutions obtained therefrom are caused by the presence of reactive sulphur compounds, particularly thiosulfates, in the original calcium chloride liquor.

The applicants have further discovered that such compounds may be converted to a higher state of oxidation by suitable oxidizing agents, with the production of a calcium chloride product of an excellent white, the water solutions of which are clear or at most have a turbidity not exceeding 10 to 20 parts per million of suspended solids.

In the usual recovery of calcium chloride from the calcium chloride-sodium chloride brine resulting from the treatment of the ammonium chloride solution with lime in the ammonia-soda process, the brine was first concentrated by evaporation until it contained from 42% to 43% by weight of calcium chloride ($CaCl_2$). The brine of this concentration was then permitted to cool and was subjected to quiet settling whereupon sodium chloride present settled out. The sodium chloride was then separated by decantation or filtration and the brine was further concentrated by evaporation until it contained from 73% to 75% of calcium chloride ($CaCl_2$). This product was then bailed directly into steel drums or was flaked. However, as noted above, the calcium chloride product possessed an undesirable grayish color and produced turbid aqueous solutions.

In accordance with the present invention an oxidizing agent is added to the brine during the purification treatment. This oxidizing agent may be added at any convenient point in the treatment of the brine and preferably is added before or during the final evaporation of the brine to 73% to 75% concentration of calcium chloride. Sufficient oxidizing agent is added to convert all of the thiosulfate present, as determined, for example, by an iodine titration, to tetrathionate or to sulfate. Ordinarily it is preferred to employ a quantity of oxidizing agent somewhat in excess of that theoretically required to convert thiosulfate present to sulfate in alkaline or neutral solution, or to tetrathionate in acid solution. It should be noted that brines of the type herein treated frequently contain small quantities of ammonia which will serve to use up some of the oxidizing agent. Chlorine, $Cl_2$, either in liquid or gaseous form is especially satisfactory. Other oxidizing agents also may be employed for this purpose although not to the same advantage as chlorine, for example, potassium chlorate ($KClO_3$), bromine ($Br_2$), sodium hypochlorite (NaOCl), bleaching powder ($CaOCl_2$), or hydrogen peroxide ($H_2O_2$).

If the oxidizing agent is added to the brine before the calcium chloride has obtained a maximum concentration, the process possesses additional advantages. Ordinarily iron equipment is employed for the concentration of the brine. This seems to result in the formation of iron compounds and produces a corresponding contamination of the product. Apparently the calcium chloride in concentrated aqueous solution at high temperatures is hydrolyzed producing hydrochloric acid. This acid either directly or indirectly results in the destruction of the iron vessels or heating coils, with the formation of iron chloride, which not only reacts with other products present but is itself converted by hydrolysis to black (magnetic) iron oxide. Hence discoloration of the calcium chloride results.

Copper is not seriously affected by the hydrochloric acid in the degree of dilution in which it is present as a result of this hydrolysis. However, when thiosulfates are present in the solution, they react with metals to form sulfides in accordance with the following equation:

$$Na_2S_2O_3 + 2Cu \rightarrow Cu_2S + Na_2SO_3$$

Also the sodium thiosulfate is apparently decomposed by the high temperature prevailing during the concentration step forming some sodium sulfide in accordance with the equation:

$$4Na_2S_2O_3 \rightarrow 3Na_2SO_4 + Na_2S_5$$

Furthermore some of the thiosulfate apparently is reduced, producing free sulfur in accordance with the equation $$Na_2S_2O_3 \rightarrow Na_2SO_3 + S$$

Then again hydrochloric acid resulting from the hydrolysis of calcium chloride may react with thiosulfates to form sulfur dioxide and free sulfur, $$2HCl + Na_2S_2O_3 \rightarrow 2NaCl + SO_2 + S + H_2O$$

In the presence of the metal sulfides and free sulphur, copper is attacked even more readily than iron. Consequently no advantage in purity of product would be gained by employing copper.

When the brine is treated with an oxidizing agent while the calcium chloride concentration is yet relatively low i. e. at or below 43% $CaCl_2$, so that relatively little or no free hydrochloric acid is produced by hydrolysis, thiosulfates present are converted to higher sulfates which are inert with respect to metallic equipment. Formation of elementary sulphur by reaction of thiosulfates with hydrochloric acid is thus avoided. Iron vessels may be employed for the earlier concentration stage as well as for the oxidizing step if this is carried out as a separate step. Since the boiling temperatures of the earlier concentration stage are too low to produce substantial hydrolysis and formation of hydrochloric acid, the iron equipment will not be deleteriously affected. The brine may then be transferred to copper equipment for carrying out the final evaporation or concentration and because no thiosulfates, sulfides, or elementary sulphur are present there will be no resultant injury to the product or to the copper equipment. Hence a calcium chloride of considerably increased purity may be obtained. Furthermore, any sulfur present will exist in the form of higher sulfates of sodium or calcium, or other suitable metal, which are white and do not adversely affect the whiteness of the calcium chloride product or the clarity of aqueous solutions prepared therefrom.

We have further found that treatment of the calcium chloride brine from the ammonia-soda process with an acid also improves the color of the calcium chloride product. By employing an acid prior to treatment with an oxidizing agent less of the oxidizing agent, for example only about 25% to 50% of the amount otherwise required, is necessary for obtaining a substantially white product capable of forming clear solutions. In this manner the cost of the oxidizing agent necessary for effecting the production of white calcium chloride is materially reduced, yet a product of equal commercial value is obtained.

It is preferred to employ as an acid for the treatment of the brine a strong inorganic acid capable of decomposing sulphur compounds, such as thiosulfates, present. Sulphuric acid and hydrochloric acid may be employed for this purpose to advantage, or weaker acids such as carbonic acid may be used. Apparently the hydrochloric acid reacts with the sodium thiosulfate present in accordance with the equation:

$$Na_2S_2O_3 + 2HCl \rightarrow 2NaCl + H_2O + SO_2 + S$$

The other strong inorganic acids probably react in a similar manner. When the calcium chloride brine is heated and especially when it is also subjected to aeration, during the acid treatment, sulphur dioxide formed is expelled as a gas and sulphur formed tends to precipitate. The elementary sulphur is not again converted to thiosulfate by subsequent oxidation treatment and hence its removal need not be effected until after the oxidation. Where chlorine is employed as the oxidizing agent, the excess acid from the acidification and any chlorine from the chlorination may be removed by adding calcium carbonate to the solution. Excess calcium carbonate also may assist in removing elementary sulphur, together with which it may be separated from the solution by settling and filtration.

Figs. 1 and 2 are flow sheets illustrating the process.

As examples of our process for the production of a white calcium chloride product the following specific embodiments of our invention are described.—

*Example 1.*—A calcium chloride-sodium chloride brine obtained by treating the ammonium chloride solution resulting from the ammonia-soda process with lime as above described is settled to remove suspended material. The clear settled brine may possess a composition on the order of the following, expressed in grams per liter of solution:

| | Grams |
|---|---|
| Calcium chloride, $CaCl_2$ | 114.00 |
| Sodium chloride, NaCl | 48.00 |
| Calcium sulfate, $CaSO_4$ | 1.25 |
| Sodium thiosulfate, $Na_2S_2O_3$ | 0.17 |
| Calcium oxide, CaO | 1.40 |
| Water | 953.00 |

(The sodium thiosulfate content was determined by titration with iodine and required 108 cc. of 1/100th normal iodine solution). This brine is concentrated by evaporation in multiple effect steam heated evaporators or other suitable means, until it contains about 43% calcium chloride by weight. The resultant solution containing suspended sodium chloride crystals is then drawn off to a settling tank and permitted to cool and settle whereby additional sodium chloride present in solution crystallizes out. The sodium chloride is separated by decantation. The brine is then treated with a sufficient quantity of chlorine, or other suitable oxidizing agent, to convert the thiosulfate present to sulfate, in accordance with the equation, representing the reaction in alkaline solution:

$$Na_2S_2O_3 + 4Cl_2 + 5CaO \rightarrow Na_2SO_4 + CaSO_4 + 4CaCl_2$$

The oxidation preferably is carried out in an iron vessel or some other equipment that is not affected by the thiosulfates present. For a calcium chloride brine containing the proportion of thiosulfate mentioned above, only about 1.7 grams of chlorine per liter of brine are required. The chlorine may be used either in liquid or gaseous form.

After the oxidation of thiosulfate is complete, as determined by an iodine titration for example, the brine is withdrawn from the oxidation vessel, filtered if necessary, and then transferred to a copper evaporator to complete the concentration of the brine to a calcium chloride content of 73% to 75%. Any suitable evaporator may be employed for this purpose heated by any suitable means, for example by steam coils or by direct firing, the former, however, being preferred.

The resultant brine is then withdrawn and bailed into drums or flaked or otherwise placed in form for shipment or subsequent use.

*Example 2.*—A settled calcium chloride brine of the composition set forth in Example 1 is treated for the removal of sodium chloride in the usual manner by evaporating it to a concentration of 43% calcium chloride by weight and then permitting the solution to settle quietly. The clear solution which is decanted off from the sodium chloride is a calcium chloride brine having a specific gravity of about 1.44.

A small quantity of hydrochloric acid is then added to the solution to render the solution slightly acid. About 4.5 grams of 36% hydrochloric acid are sufficient for each liter of the concentrated calcium chloride brine resulting from evaporation of a brine of the above representative composition. The amount of hydrochloric acid or other acid used to neutralize the alkalinity of the brine and render it slightly acid may be determined by titration of a sample and will vary with the composition of the particular brine treated. After acidification the brine is heated to between 65° and 124° C. (the approximate atmospheric boiling point) and subjected to aeration for a period of from ¼ hour to 2 hours, depending upon the temperature; aeration may be obviated by vigorously boiling the brine for about ½ hour. This treatment appears to cause the decomposition of a portion of the thiosulfate present in accordance with the equation, representing the reaction in acid solution:

$$Na_2S_2O_3 + 2HCl \rightarrow 2NaCl + H_2O + SO_2 + S.$$

The heating and aeration drive off from the solution the sulphur dioxide formed.

The brine is then treated with a sufficient quantity of chlorine to convert the thiosulfate present to tetrathionate in accordance with the equation:

$$2Na_2S_2O_3 + Cl_2 \rightarrow Na_2S_4O_6 + 2NaCl$$

The acid treatment and oxidation preferably are carried out in a brick-lined iron vessel or some other equipment that is not affected by the acids present. The chlorine may be used either in liquid or gaseous form.

After the oxidation of thiosulfate is substantially complete, as determined by an iodimetric titration for example, the brine is neutralized by the addition of calcium carbonate. The excess calcium carbonate and any sulphur that may have been precipitated during the acid treatment and oxidation are settled. The solution is filtered to remove the last remaining particles of this material. The clear filtrate is transferred to a copper evaporator to complete the concentration of the brine to a calcium chloride content of 73% to 75%. Any suitable evaporator may be employed for this purpose heated by any suitable means, for example by steam coils or by direct firing, the former being preferred. The calcium chloride brine which is free from thiosulfates does not tend to attack the copper equipment and hence impurities from this source are avoided. At the same time the life of the equipment is prolonged. The concentrated brine may be withdrawn from the evaporator and bailed into drums or flaked or otherwise placed in condition for shipment or subsequent use.

It is to be understood, of course, that the type of equipment and arrangement of steps may be varied within the purview of the present invention. Other types of evaporators might be employed, for example spray evaporators; decantation might be effected by means of centrifuges instead of quiet settling, and the order of steps likewise may be varied. The oxidizing agent may for example be added to the solution while it is yet dilute and before any of the other steps of purification have been effected, or it may be added during any of the individual steps or between any of the individual steps of the process.

We claim:

1. In the recovery of calcium chloride from a calcium chloride brine resulting from the regeneration of ammonia in the ammonia-soda process, the improvement which comprises contacting the brine with an oxidizing agent.

2. In the recovery of calcium chloride from the calcium chloride brine resulting from the regeneration of ammonia in the ammonia-soda process, the improvement which comprises bringing the brine into contact with chlorine.

3. In the recovery of calcium chloride from the calcium chloride brine resulting from the regeneration of ammonia in the ammonia-soda process, the improvement which comprises heating the brine with an inorganic acid sufficiently strong to decompose a part of the thiosulfate present.

4. In the recovery of calcium chloride from the calcium chloride brine resulting from the regeneration of ammonia in the ammonia-soda process, the improvement which comprises heating the brine with an inorganic acid and subjecting the brine to aeration.

5. The method of treating the thiosulfate-containing calcium chloride brine resulting from the regeneration of ammonia in the ammonia-soda process, which comprises heating the brine with an inorganic acid sufficiently strong to decompose a part of the thiosulfate present, and then contacting the brine with an oxidizing agent in sufficient amount to oxidize substantially all the remaining thiosulfate.

6. The method of treating a thiosulfate-containing calcium chloride brine resulting from the regeneration of ammonia in the ammonia-soda process, which comprises introducing gaseous chlorine into the calcium chloride brine to oxidize the thiosulfate present.

7. The method of treating a thiosulfate-containing calcium chloride brine resulting from the regeneration of ammonia in the ammonia-soda process, which comprises heating the calcium chloride brine with a strong inorganic acid to decompose a portion of the thiosulfate present and aerating the brine to expel resultant sulfur dioxide, and subsequently introducing gaseous chlorine into the brine in sufficient amount to oxidize substantially all the remaining thiosulfate present.

8. The method of treating thiosulfate-containing calcium chloride-sodium chloride brine resulting from the regeneration of ammonia in ammonia-soda process, which comprises adjusting the concentration of said brine to a content of about 43% calcium chloride by weight, settling the resultant brine to separate sodium chloride therefrom, contacting the separated solution with an oxidizing agent so as to oxidize thiosulfates present.

9. The method of treating thiosulfate-containing calcium chloride-sodium chloride brine resulting from the regeneration of ammonia in the ammonia-soda process, which comprises adjusting the concentration of said brine to a content of about 43% calcium chloride, settling the resultant brine to separate sodium chloride therefrom, heating the separated solution with hydrochloric acid thereby decomposing a portion of the thiosulfate content of the brine, subjecting the brine to aeration to expel resultant sulfur dioxide, contacting the resultant solution with chlorine so as to oxidize the remaining thiosulfate present, neutralizing the solution with calcium carbonate, and subsequently separating the solution from suspended solids.

10. The method of treating thiosulfate-containing calcium chloride-sodium chloride brine resulting from the regeneration of ammonia in the ammonia-soda process, which comprises adjusting the concentration of said brine to a content of about 43% calcium chloride, settling the resultant brine to separate sodium chloride therefrom, heating the separated solution with an inorganic acid thereby decomposing a portion of the thiosulfate content of the brine, subjecting the brine to aeration to expel resultant sulfur dioxide, contacting the resultant solution with chlorine so as to oxidize the remaining thiosulfate present, neutralizing the solution with calcium carbonate, subsequently separating the solution from suspended solids, and evaporating the solution to a concentration of at least 73% calcium chloride.

11. In the recovery of calcium chloride from a dilute thiosulfate-containing calcium chloride brine, the improvement which comprises intimately contacting the brine with an oxidizing agent to oxidize thiosulfate and subsequently evaporating the brine.

12. In the recovery of calcium chloride from a dilute thiosulfate-containing calcium chloride brine wherein the brine is concentrated to above 73% $CaCl_2$, the improvement which comprises intimately contacting the brine with an oxidizing agent to oxidize thiosulfate while the concentration of $CaCl_2$ is less than 43%, and subsequently evaporating the brine to obtain a concentration of $CaCl_2$ above 73%.

13. In the recovery of calcium chloride from a dilute thiosulfate-containing calcium chloride brine wherein the brine is concentrated to above 73% $CaCl_2$, the improvement which comprises removing the thiosulfate from the brine while the concentration of $CaCl_2$ is less than 43%, and subsequently evaporating the brine in copper to obtain a concentration of $CaCl_2$ above 73%.

14. In the recovery of calcium chloride from a calcium chloride brine resulting from the regeneration of ammonia in the ammonia-soda process, the improvement which comprises contacting the brine in alkaline condition with an oxidizing agent.

CARL SUNDSTROM.
JOHN W. HAYES.

CERTIFICATE OF CORRECTION.

Patent No. 2,032,727.  March 3, 1936.

CARL SUNDSTROM, ET AL.

It is hereby certified that error appears in the printed specification of the above numbered patent requiring correction as follows: Page 3, second column, line 49, claim 4, after "acid" insert the words sufficiently strong to decompose a part of the thiosulfate present; page 4, first column, line 5, claim 8, after "in" insert the; and that the said Letters Patent should be read with these corrections therein that the same may conform to the record of the case in the Patent Office.

Signed and sealed this 28th day of April, A. D. 1936.

Leslie Frazer (Seal)  Acting Commissioner of Patents.